Oct. 13, 1964  H. W. ALLHOFF, JR  3,152,572
LEAK INDICATOR
Filed Feb. 12, 1963  2 Sheets-Sheet 1

INVENTOR.
HENRY W. ALLHOFF, JR.
BY Kimmel & Crowell
ATTORNEYS.

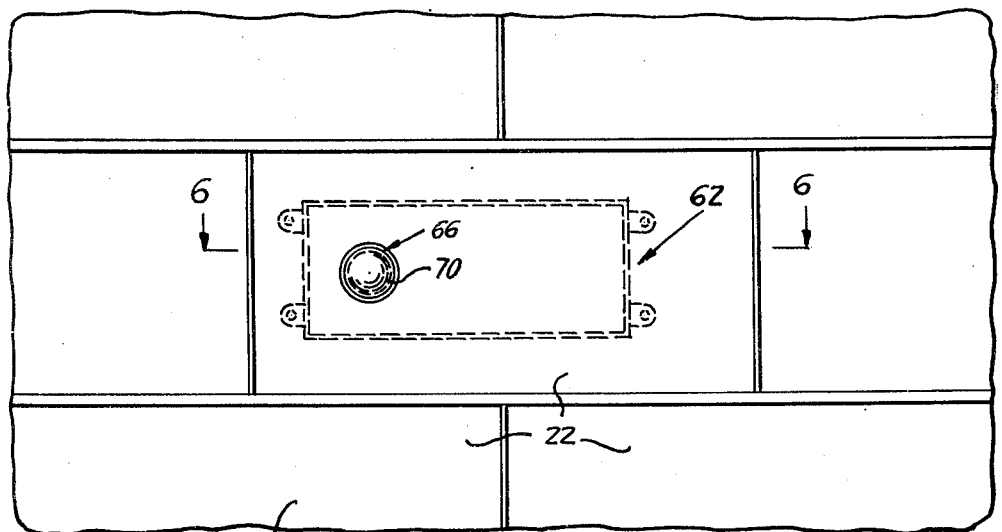
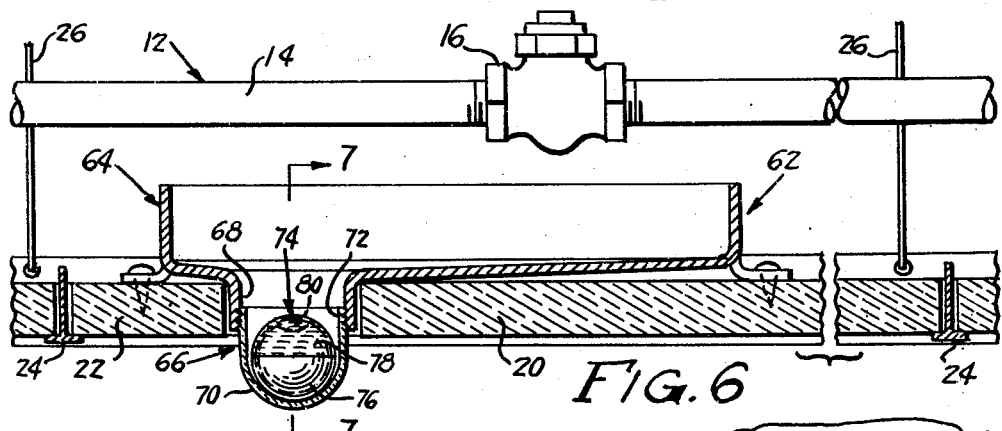
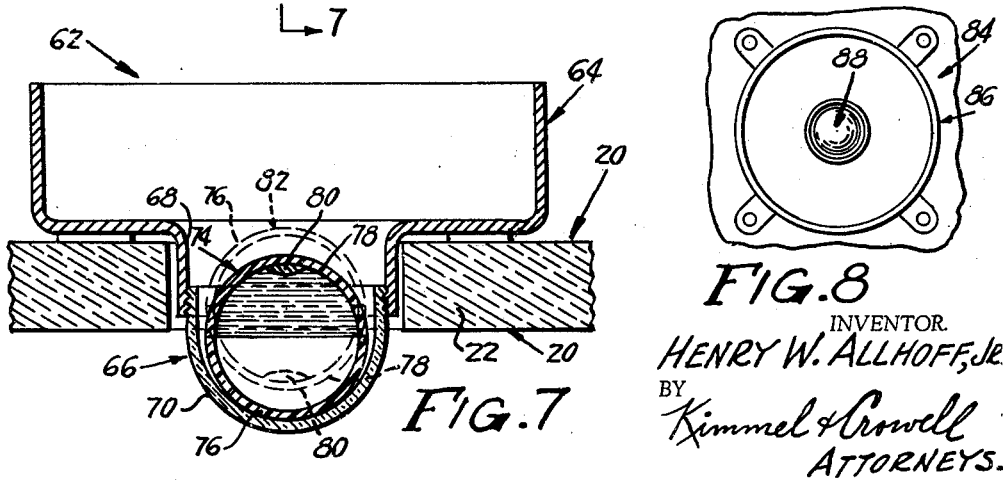

United States Patent Office

3,152,572
Patented Oct. 13, 1964

3,152,572
LEAK INDICATOR
Henry W. Allhoff, Jr., 4389 St. Regina Lane, St. Ann, Mo.
Filed Feb. 12, 1963, Ser. No. 258,082
6 Claims. (Cl. 116—118)

This invention relates to a leak indicator and relates more particularly to a device for detecting leaks in fluid flow systems.

A primary object of this invention is the provision of a device to visually indicate the presence of a leak in a fluid flow system which is normally hidden from view.

Another object of this invention is to provide a device of the type described which may be supported on a ceiling and which will indicate to one below the ceiling the presence of a leak in fluid flow system above the ceiling.

A further object of the instant invention is to provide a leak indicator supported by a ceiling panel and having an indicating surface visible through the ceiling panel and means behind the indicating surface to indicate the presence of a leak above the ceiling.

A still further object of this invention is the provision of a device for detecting leaks having a catch pan which may be positioned under a portion of a fluid flow system, particularly a valve or the like, which is subject to leaks.

Another object of the instant invention is to provide a leak indicator positionable under a valve or the like and having a catch pan with a well formed therein and means in the well to indicate the presence of leaking fluid.

A further object of the instant invention is the provision of a device of the type described having a well with an indicating surface visible from below a ceiling or the like and a float normally resting on the indicating surface and upwardly displaced by the presence of leaking fluid.

Another object of this invention is to provide such a device where the float is of a brightly colored material and the indicating surface is transparent so that on upward displacement of the float by a leaking fluid a visual indication will be readily presented to one below the device.

A further object of this invention is to provide a device for indicating leaks in a fluid flow system having a substantially spherical float formed of two differently colored hemispherical portions with one portion being weighted and the other portion normally resting on a transparent indicating surface so that when the float is displaced by leaking fluid it will invert and present the color of the weighted portion to indicate the presence of a leak.

A still further object of this invention is to provide a leak indicator having a catch basin and a well with an indicating surface supporting a float, wherein the well is asymmetrically positioned with respect to the geometrical shape of the catch basin to provide greater flexibility in use.

A further object of the instant invention is the provision of such a device having removable means to easily drain the catch pan.

Another object of the instant invention is to provide a leak indicator wherein a small portion of fluid soluble coloring matter is included therewith to assist in indicating the presence of a leak.

Other and further objects reside in the combinations of elements, arrangements of parts, and features of construction.

Still other objects will in part be obvious and in part be pointed out as the description of the invention proceeds and as shown in the accompanying drawings wherein:

FIGURE 5 is a fragmentary bottom plan view similar to FIGURE 1 of another modification of the device of the instant invention;

FIGURE 6 is an enlarged vertical cross-sectional view taken on line 6—6 of FIGURE 5, with parts broken away for illustrative convenience;

FIGURE 7 is a vertical cross-sectional view on line 7—7 of FIGURE 6 showing the displaced and inverted position of the float in dotted lines; and FIGURE 8 is a top plan view of a modified form of the device of FIGURES 5–7.

Similar reference characters refer to similar parts throughout the several views of the drawings.

Figure 1:
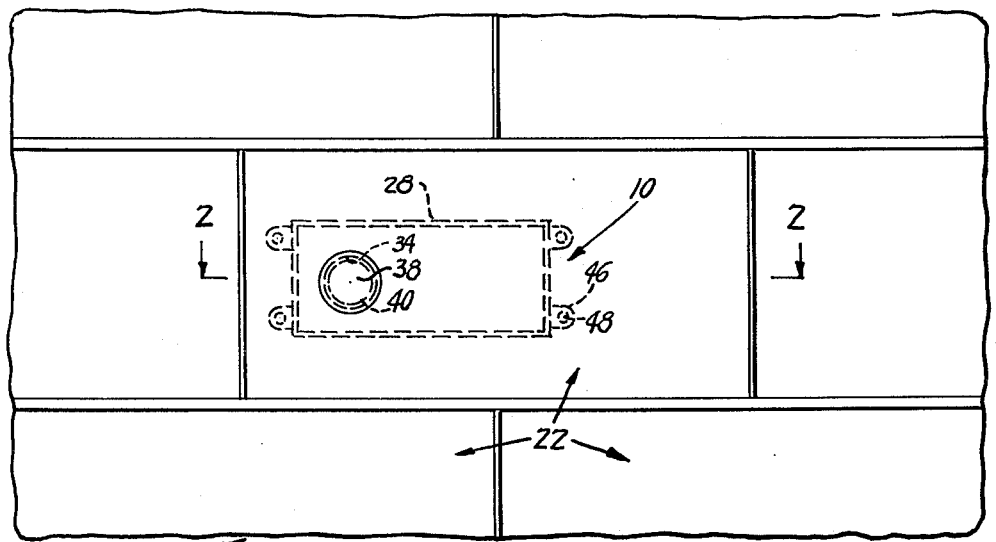
FIGURE 1 is a fragmentary bottom plan view of a ceiling formed of a plurality of panels showing one embodiment of the device of the instant invention as it would be supported thereon.

Referring now to the drawings, the device of the instant invention is indicated generally by the reference numeral 10. As shown clearly in FIGURE 2, a fluid flow system indicated generally at 12 is comprised of one or a plurality of conduits 14 (only one being shown for illustrative convenience) having valves or the like 16, and is normally supported in the space 18 above a ceiling indicated generally by the reference numeral 20. In the embodiment shown, the ceiling 20 is comprised of a plurality of removable panels 22 resting on T-shaped supports 24 and secured to an overhead supporting surface (not shown) by rods 26 or the like. It is to be understood that the ceiling 20 may be of any conventional form and that the construction thereof is not a critical part of the instant invention. It is also to be understood that although the leak indicator 10 of the instant invention has been shown in cooperation with a ceiling that it has application wherever a gravity type indicator could be utilized.

The leak indicator 10 has a catch pan 28 with an upstanding peripheral wall 30 and a bottom 32. A well 34 is defined in the bottom 32 of the catch pan 28 and has a downwardly extending peripheral side wall 36 and a bottom indicating surface 38. The catch pan 28 and the well 34 may be formed of any desired material such as plastic, glass, metal or the like, and may be integrally formed in a single piece. The indicating surface 38 however, must be transparent and may be removably secured to the peripheral side walls 36 of the well 34 in a manner and for a purpose to be described further hereinafter.

Figure 3:
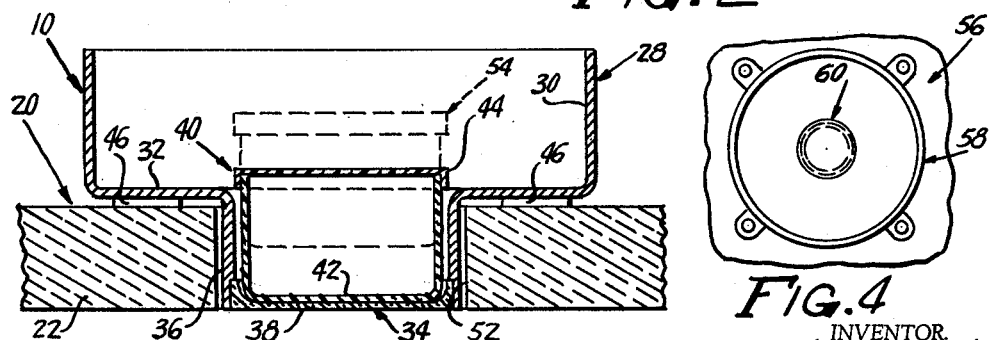
FIGURE 3 is an enlarged vertical cross-sectional view on line 3—3 of FIGURE 2 showing the displaced position of the float in dotted lines.

A float 40 is disposed within the well 34 and is light and buoyant. The float 40 has a bottom surface 42 normally resting on the indicator surface 38 of the well 34 as shown in FIGURE 3, and may be formed hollow as shown, with a light cover 44 enclosing the top thereof. The float 40, like the remainder of the device 10 may be formed of any conventional material. At least the bottom surface 42 of the float 40 is brightly colored to facilitate detection of a leak in a manner to be pointed out further hereinafter.

A plurality of outstanding lugs 46 may be formed integral with the catch pan 28 and may have apertures 48 defined therein for insertion of any conventional fastening means 50 such as screws, nails, or the like.

The use and operation of the device of the instant invention will now be apparent. Where a portion of the fluid flow system 12 is subject to leaks, one of the ceiling panels 22 is removed and an aperture 52 is defined therein for reception of the well 34. The device 10 is then mounted above the ceiling panel 22 and is secured thereto by the fastening means 50 so that at least a portion of the catch pan 28 underlies the portion of the fluid flow system subject to leaks. The float 40 is placed in the well 34 so that its brightly colored bottom surface 42 rests upon the indicating surface 38 of the well 34 and is visible therethrough. Any fluid leaking from the flow system 12 will be received by the catch pan 28 and will flow into the well 34 around the float 40 which is loosely fitted therein causing the float 40 to be displaced upwardly to a position such as shown in dotted lines at 54 in FIGURE 3 wherein the bottom surface 42 is remote from the indicating surface 38 of the well 34. This change in position will be clearly visible through the transparent indicating surface 38 to anyone standing below the ceiling 20. If the distinction is visibly insufficient, a small amount of coloring matter may be included as an indicator in a manner to be further described hereinafter.

Figure 2:
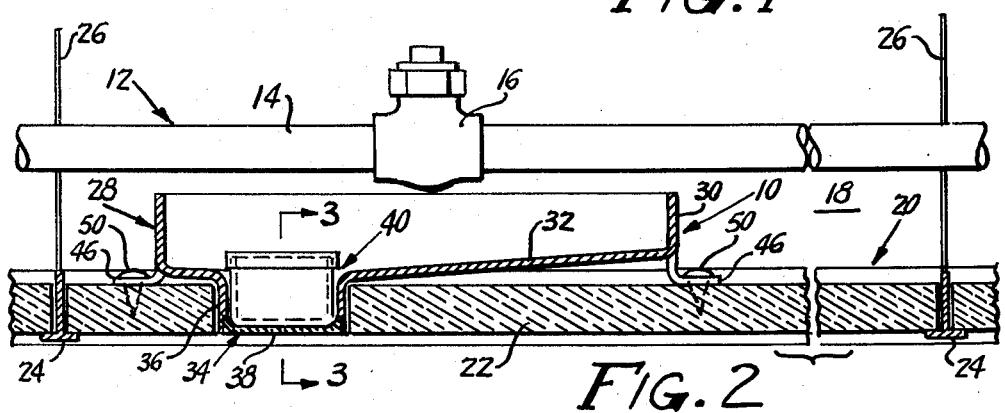
FIGURE 2 is an enlarged vertical cross-sectional view on line 2—2 of FIGURE 1 showing the relationship of the device of the instant invention to a fluid flow system, with parts broken away for illustrative convenience.

As clearly shown in FIGURE 2, it is preferred to have the bottom wall 32 of the catch pan 28 downwardly slanted from the peripheral wall 30 to the well 34 to assist in carrying fluid received from the catch pan 28 to the well 34.

The device 10 may be emptied of fluid by simply removing the panel 22 and pouring the same from the catch pan 28 and the well 34 or the indicating surface 38 may be removably secured thereto such as by a press fit as shown in FIGURES 2 and 3 whereby it can be easily knocked out or pulled out by a lug or handle (not shown) secured to the bottom thereof. Instead of press fitting the parts, they may be threadably secured or a scored knock out portion or simple check valve may be included in the well. It will be noted that the cover 44 may be made large enough to prevent the float 40 from falling through the aperture formed when the indicating surface 38 is removed from the well 34 if desired.

The embodiment of FIGURES 1–3 has been shown generally rectangular in form with the well 34 disposed in one end thereof to provide greater flexibility in use. For example, it may be desirable to have the indicating surface 38 positioned in a definite location in the ceiling 20 while the portion of the fluid flow system 12 subject to leaks such as the valve 16 may not be directly thereover. With the design shown, the indicating surface 38 may be placed in the desired location while the remote end of the catch pan 28 may be positioned under the valve 16 to receive leaking fluid. The catch pan 28 may be of any desired form and may be extended as far as necessary away from the well 44 to allow for the desired flexibility.

Figure 4:
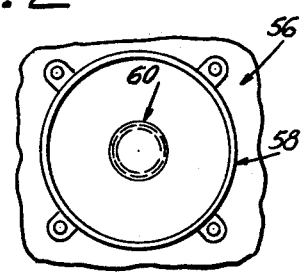
FIGURE 4 is a stop plan view of a modified form of the device of FIGURES 1–3.

If the location of the indicating surface in the ceiling 20 is not critical, a modified form of the device as indicated generally at 56 in FIG. 4 may be used. In this embodiment the catch basin 58 may be circular in form and the well 60 may be defined concentrically therewith.

Another embodiment of the leak indicator of the instant invention is shown generally at 62 in FIGURES 5–7 and has a catch pan 64 similar in form to the catch pan 28 of the embodiments of FIGURES 1–3. The well 66 in this form of the device has a downwardly extending internally threaded peripheral side wall 68 and a hemispherical indicating surface 70 having an upwardly extending externally threaded cylindrical portion 72 engageable with the peripheral wall 68. A substantially spherical float 74 is disposed within the well 66 and is formed of two substantially hemispherical portions 76 and 78 secured together in any conventional manner. The upper portion 78 carries a weight 80 and the two portions are differently colored. When the float 74 is upwardly displaced by leaking fluid within the well 66 to the position shown in dotted lines at 82, it is inverted by the weight 80 so that the color of the upper hemispherical portion 78 will be disposed in juxtaposition to the indicating surface 70 and will be visible therethrough by someone standing below the ceiling 20.

It will be seen that in the embodiment of FIGURES 5–7 the indicating surface 70 extends below the level of the ceiling 20 to facilitate emptying the device 62 by unscrewing the indicating surface 70 from the well 66. In the embodiment of FIGURES 1–3 the indicating surface 38 is disposed flush with the bottom of the ceiling 20 to increase the aesthetic appearance thereof.

The embodiment of FIGURES 5–7 can be modified as indicated generally at 84 in FIGURE 8 to provide a catch pan 86 circular in form and a well 88 disposed concentrically therewith in the manner of the modification of FIGURE 4.

In the event that the visual indication provided by the upward displacement of the float 40 is not sufficiently noticeable from below, a small amount of coloring matter, soluble in the fluid carried by the fluid flow system 12, such as a paint or the like, may be included preferably at either the extreme upper periphery of the well or on the floor of the catch pan immediately surrounding the well. Thus, on the presence of fluid leaking from the flow system 12, the visual indication would be enhanced by the coloring matter.

It is to be understood that the valve 16 can be of any form including manual type valves or automatic constantly cycling control valves or the like.

If desired, the instant inventive concept may be easily extended to use in conjunction therewith a pair of spaced contacts which when electrically connected by leaking fluid, energize an additional visual indicator such as a light or the like or energize an audible indicator such as an alarm bell or the like.

Gutters of any form may be provided to carry leaking fluid from numerous physically separated valves to a single indicator or a single indicator may be used for each valve.

It will now be seen that there is herein provided a leak indicator which satisfies all of the objects of the instant invention and others, including many advantages of great practical utility and commercial importance.

Since many embodiments may be made of this inventive concept and since many modifications may be made of the embodiments hereinbefore shown and described, it is to be understood that all matter herein is to be interpreted as merely illustrative, and not in a limiting sense.

I claim:

1. A device for indicating leaks in a fluid flow system located above a ceiling comprising a catch pan having an upstanding peripheral wall and a bottom, said catch pan being positioned under a portion of said system subject to leaks, a well defined in said bottom of said catch pan and disposed in an aperture in the ceiling, said well having a transparent surface visible from below the ceiling, a float in said well normally resting on said surface, and means associated with said float to visually indicate through said surface to one below the ceiling the displacement of said float in said well by fluid leaking from said system.

2. A device in accordance with claim 1 wherein said surface is substantially flat and said float has a brightly colored flat surface normally resting on said surface.

3. A device in accordance with claim 1 wherein said surface is substantially hemispherical, said float being substantially spherical and having two hemispherical portions, said hemispherical portions being of different colors, one of said hemispherical portions normally resting on said surface and the other of said hemispherical portions being weighted, said float being inverted by said weighted hemispherical portion when fluid leaking from said system displaces said float in said well.

4. A device in accordance with claim 1 wherein said catch pan is elongated and has two ends, one end of said catch pan being positioned under said portion of said system subject to leaks and said well being disposed in the other end of said catch pan.

5. A device in accordance with claim 1 wherein said surface is removably secured to said well.

6. A device in accordance with claim 1 further including a small portion of fluid soluble coloring matter different from the color of said float disposed in said well.

References Cited in the file of this patent

UNITED STATES PATENTS

| | | |
|---|---|---|
| 671,798 | Hamilton | Apr. 9, 1901 |
| 1,456,045 | Wikin | May 22, 1923 |
| 1,900,591 | Taylor | Mar. 7, 1933 |
| 2,004,502 | Fieberling | June 11, 1935 |
| 2,164,666 | Simmons | July 4, 1939 |
| 2,917,924 | Mersick | Dec. 22, 1959 |